United States Patent [19]

Tschantz

[11] 4,392,566
[45] Jul. 12, 1983

[54] BULK MATERIAL HANDLING AND RECLAIMING EQUIPMENT

[75] Inventor: William H. Tschantz, Canton, Ohio

[73] Assignee: Quadracast, Inc., Canton, Ohio

[21] Appl. No.: 288,029

[22] Filed: Jul. 29, 1981

[51] Int. Cl.³ ............................................ B65G 17/36
[52] U.S. Cl. .................................... 198/509; 37/189; 198/714
[58] Field of Search ............... 198/307, 509, 703, 705, 198/706, 713, 714; 414/133; 37/91–96, 189, 190

[56] References Cited

U.S. PATENT DOCUMENTS

| | | | |
|---|---|---|---|
| 1,550,891 | 8/1925 | Eck | 198/714 |
| 2,872,157 | 2/1959 | Brell | 198/509 |
| 3,612,246 | 10/1971 | Elze et al. | 198/509 |
| 3,788,446 | 1/1974 | Postel-Vinay | 198/509 |
| 4,009,531 | 3/1977 | Metrier | 198/509 |
| 4,057,139 | 11/1977 | Mausolf et al. | 198/509 |
| 4,249,651 | 2/1981 | Krükemeier et al. | 198/509 |

FOREIGN PATENT DOCUMENTS

| | | | |
|---|---|---|---|
| 1012254 | 7/1957 | Fed. Rep. of Germany | 414/133 |
| 1245844 | 7/1967 | Fed. Rep. of Germany | 198/509 |

Primary Examiner—Joseph E. Valenza
Assistant Examiner—Jonathan D. Holmes
Attorney, Agent, or Firm—Oldham, Oldham, Hudak, Weber & Sand Co.

[57] ABSTRACT

A bulk material handling and reclaiming device of a nature that can be added to or substituted in known reclaiming installations. Bulk material such as coal delivered by a conveyor from a mine normally is delivered by a conveyor in large quantities during the period of mine operation to storage areas where it is stacked in mounds covering circular or rectangular storage areas. The new reclaimer has a cage on which a plurality of sets of buckets are moved in either direction by chains to which the buckets are pivoted, the chains endlessly surrounding the cage. The chains are driven to move in either direction in channel tracks. The cage is nonrotatably supported and bodily moved in straight or arcuate paths in either direction toward one or another end of stacked bulk material in storage areas. The buckets dump the bulk material, scooped up by the buckets in either direction of bucket movement or cage travel, at the top of the cage into a belt conveyor mounted and moving along the axis of the cage to one end thereof to discharge the reclaimed bulk material to further transport means to deliver the same to a place of use.

10 Claims, 12 Drawing Figures

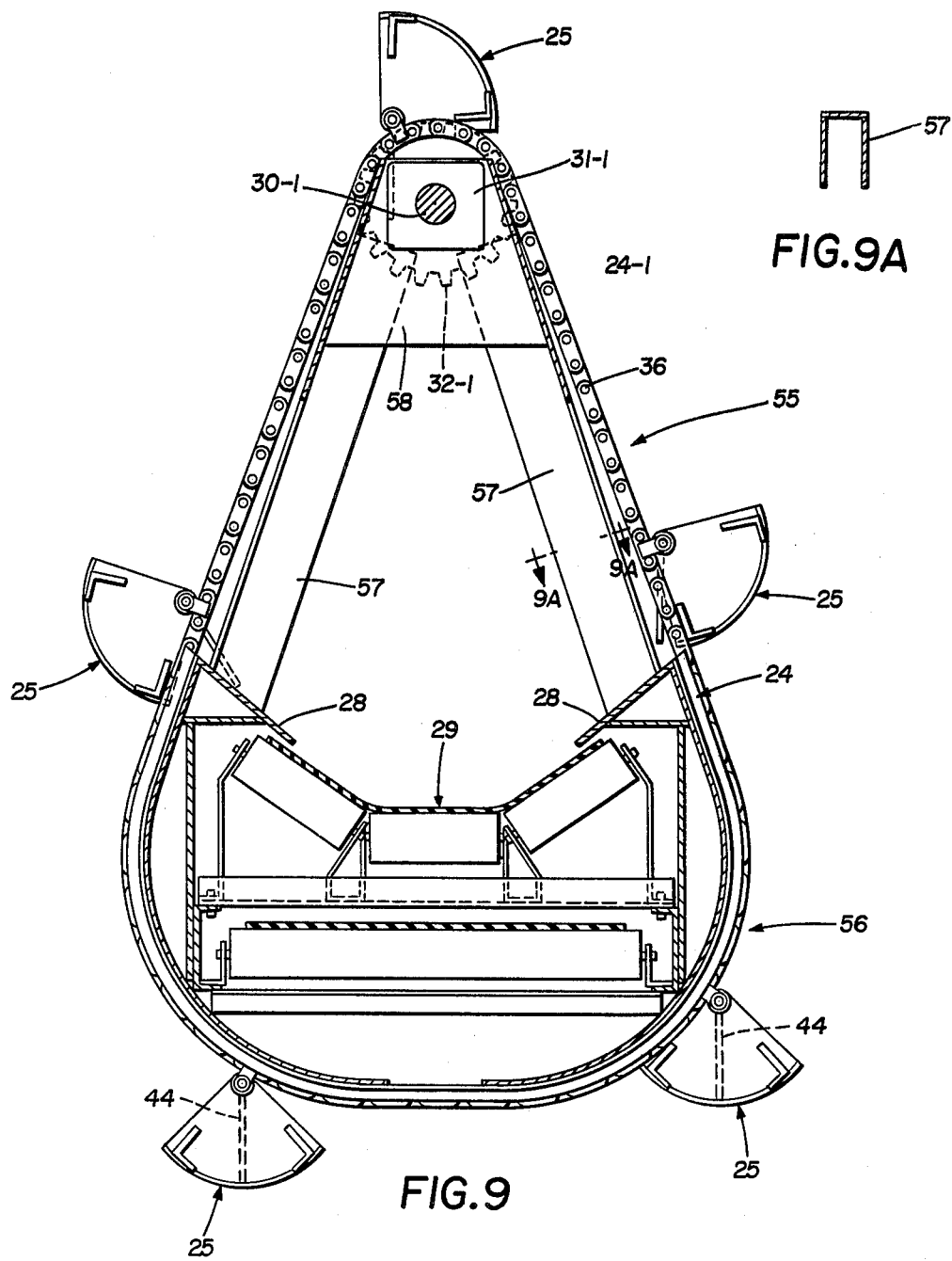

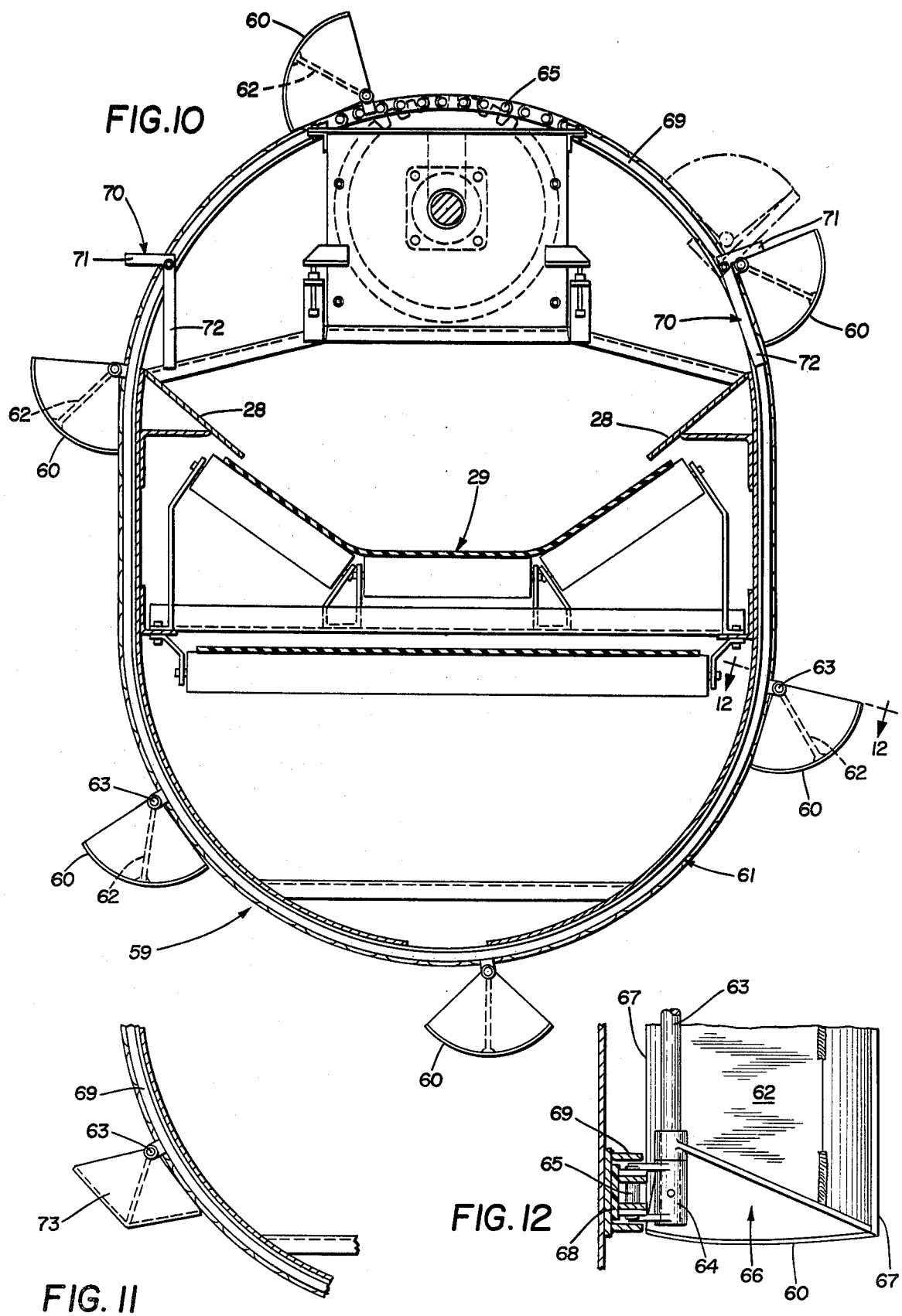

BULK MATERIAL HANDLING AND RECLAIMING EQUIPMENT

BACKGROUND OF THE INVENTION

1. Field of the Invention

The invention relates to equipment for reclaiming, handling, and conveying from one area to another location bulk material which may be temporarily stored in piles or mounds in storage areas. Such bulk material can be of innumerable types and kinds such as coal, slag, Taconite, Pyrite or iron ore pellets, clay, cinders, crushed marble, gravel, pencil pitch, salt, agricultural lime, carbon black, sand, sawdust, wood chips, wheat, soy beans and other agricultural products, for example.

The bulk material is reclaimed from such storage piles and loaded onto railroad cars, trucks, conveyors, boats or other means of transporting the materials in desired quantities from a storage location to a place of use.

The invention relates more particularly to a rotary reclaimer wherein the reclaimer unit, operatively connected with transport or conveyor means, may be moved back and forth rectilinearly or arcuately in alternate reverse directions of unit travel to scoop up and discharge to the conveyor means bulk material, stored in large quantities in stacks in longitudinal or arcuate zones, during each of the two directions of reclaimer unit travel.

Further, the invention relates particularly to such a rotary reclaimer device which has a low cost of construction as compared with prior reclaimer devices, which easily may be installed as a part of existing bulk material handling systems, in which the reclaiming of bulk material during each direction of reclaimer unit travel assures efficient use of land where large quantities of bulk material may be stored, which is energy efficient in operation, and which handles bulk material without degradation.

2. Description of the Prior Art

During the last century many prior art patents have issued, for example U.S. Pat. Nos. 233,523 and 637,716, which show bulk material reclaimer devices wherein buckets are mounted on chains and move in one direction in an orbit of travel and scoop bulk material from a pile and discharge the bulk material to a conveyor or chute for transport to a desired location.

In all known prior chain mounted bucket devices the buckets move in one direction only in the orbit of bucket travel even though the support for the chain mounted buckets may be moved back and forth along a bulk material storage area in straight or arcuate directions. As a result, the buckets can only reclaim bulk material stacked in the storage area when the bucket support is moved only in one direction. Movement of the bucket support in the other direction only permits the storage area to be refilled by a stacker or other bulk material discharge means so that when the bucket support again moves in the one direction it can then reclaim material from the stack area.

Another known reclaimer device shown in U.S. Pat. No. 476,616 includes a boom which sweeps back and forth in an arcuate path. The boom comprises a trusslike structure which supports a paddlelike pusher chain conveyor moving in one direction from an outer end of the cantilever supported boom to the pivot center of the arcuate sweeping boom.

In the operation of this device the paddles are operative to push bulk material toward the boom pivot center as the boom swings or sweeps in either direction of arcuate movement. However, the paddles in conveying bulk material from the pile, move at right angles to the end of the pile as the boom moves toward that end of the pile, subjecting the cantilever mounted boom to great stress, thus requiring a heavy trusslike boom structure to resist such lateral stress and at the same time to support the lengthy chain mounted paddle pusher device.

Still another type of bulk material reclaimer is shown in U.S. Pat. Nos. 3,612,246 and 3,915,286. In each of these devices a series of scoops is formed as a part of a cylindrical wall of a rotary barrel which is moved along a path of travel so that the barrel as rotated bites into the end of a stack of bulk material.

In U.S. Pat. No. 3,612,246 the barrel has considerable axial length, is double walled with an annular compartment therebetween with which the scoops communicate to discharge reclaimed material from the annular compartment to an internal conveyor. This disclosure indicates that the barrel may be rotated in either direction and the scoops for multi-direction rotation are formed as opposite opening twin scoops. This construction is quite complicated and massive and requires considerable power to rotate the barrel as it bites into a stack of bulk material.

The device of U.S. Pat. No. 3,915,286 avoids some of these difficulties by using a barrel with a single series of integral scoops the lateral width of the scoops defining the axial length of the barrel. The rotating barrel rotates in one direction only and is moved axially back and forth along a massive movable support which straddles the storage stack of bulk material, so that the barrel traverses the end of the stack of bulk material being retrieved. Even though this variation in construction of rotary barrel has reduced barrel rotation power requirements, the physical size of the movable support structure to provide for axial barrel movement back and forth as it rotates requires a support structure which is massive.

Accordingly, a need has long existed for a simple bulk material reclaimer device wherein a series or set of buckets are pivotally mounted on a chain to move the buckets in an orbit of travel in either direction on and around a nonrotatable supporting cage with a plurality of sets of chain mounted buckets located axially adjacent one another throughout the length of the supporting cage, and in which the supporting cage may be moved back and forth either rectilinearly or arcuately in paths of travel to retrieve bulk material from stacks thereof with efficiency in energy and storage area utilization.

SUMMARY OF THE INVENTION

Objectives of the invention include providing a new reclaimer construction and operation for bulk material stored in large amounts in large storage areas extending in mounds or stacks oriented in straight or curved directions in which the reclaimer is movable bodily in either direction toward the end of stacked material in a storage area and in which the reclaimer is equipped with a number of series of buckets mounted on chains surrounding a reclaimer cage, the chains being movable in either direction in orbits of travel around the cage so as to provide a productive reclaiming operation regardless of the direction in which the reclaimer is moved back and forth toward ends of a stored stack or mound of bulk material; providing such new reclaimer which has a simple, readily manufactured and readily operated construction of cage, buckets and chain drives for the buckets on which the buckets are pivotally mounted so that the buckets may travel with minimum friction around the periphery of the reclaimer cage in endless paths of travel in either direction; providing a simplified reclaimer construction for reclaiming bulk material which may be easily installed as a component in existing bulk handling equipment and systems; providing a new reclaimer construction which minimizes destruction of, injury to or degradation of the bulk material being reclaimed; and providing a new reclaimer construction and mode of operation which achieves the stated objectives in a reliable, efficient, easily operated manner with minimum energy demands, and which solve problems and satisfy needs that long have existed in the field of reclaiming and handling bulk material.

These and other objectives and advantages may be obtained by the new reclaimer construction the general nature of which is set forth below and which may be stated as a reclaimer construction for reclaiming bulk material from mounds thereof in storage areas of the type in which the mounds extend in rectilinearly or arcuately formed mounds of stacked bulk material; including frame means having spaced upright end support members; a cage extending longitudinally between and supported on said end support members; means for moving the frame means and cage in either direction laterally of the cage toward a mound of stacked bulk material; the cage including channel track means having members extending at spaced intervals endlessly around the cage and defining the periphery of the cage; said spaced track members being formed by channel ribs opening outwardly and extending semicircularly around at least the lower portion of the cage; curved wall members connected between adjacent pairs of channel ribs terminating in edges at each side of the cage extending longitudinally of the cage; baffle walls extending downwardly inwardly longitudinally of the cage from said upper curved wall edges; an endless belt conveyor extending longitudinally below the baffle plates from one cage end to a conveyor discharge end at the other end of the cage; a chain extending along each track member for movement in an endless orbit of travel along said track means; means for moving said chains in either direction in said orbit of travel; a series of buckets pivotally mounted on said chains at spaced intervals extending between each adjacent pair of chains; the buckets in one series being mounted in staggered locations with respect to the buckets in the next adjacent series of buckets; and means for releasing material scooped by the buckets from each bucket as it moves upward along one side of the cage past an upper cage curved wall edge.

BRIEF DESCRIPTION OF THE DRAWINGS

Preferred embodiments of the invention—illustrative of the best modes in which applicant has contemplated applying the principles—are set forth in the following description and shown in the drawings and are particularly and distinctly pointed out and set forth in the appended claims.

FIG. 9 is a view similar to FIGS. 4 and 6 illustrating another modified form of the path of orbital bucket travel;

FIG. 9A is a section on lines 9A—9A, FIG. 9;

FIG. 10 is a view similar to FIGS. 4, 6 and 9 illustrating a construction similar to that shown in FIG. 6 equipped with a modified form of buckets;

FIG. 11 is a fragmentary view similar to a portion of FIG. 10 illustrating a still further modified shape of bucket; and FIG. 12 is an enlarged fragmentary view looking in the direction of the arrows 12—12, FIG. 10.

Similar numerals refers to similar parts throughout the various figures of the drawings.

DESCRIPTION OF THE PREFERRED EMBODIMENTS

All Embodiments in General

Bulk material of the types described are handled in varying quantities. Sometimes their production or supply is greater in amount and rate of delivery from a source than the particular material can be loaded onto transport devices such as railroad cars, ships, trucks and the like for ultimate delivery to a distribution location or place of use.

At other installations delivery of the bulk material either from a source or an intermediate processing facility is in quantities much less than those required economically to load the material onto transportation means such as a 100-car train for delivery to a place of use.

These limitations in the handling of bulk material require the bulk material during handling to be stacked and stored in large storage areas. A stored accumulation of bulk material, in effect, is a surge accumulation of the material for delivery to and withdrawal from storage at different rates of delivery either greater than or less than the rates of withdrawal from the stacks, piles or mounds of stored material.

For example, a coal mine operated continuously may produce coal at a certain rate which is then delivered to a wash plant for processing, the capacity of the wash plant being such as to handle say 350 tons per hour of washed coal. The washed coal, however, must be accumulated in a storage area until more than 10,000 tons is available for rapid loading into a 100-car freight train since it is not economical to have a railroad deliver 100 cars to be loaded unless they all can be loaded rapidly in a short period of time. Otherwise, large payments must be made to the railroad for the cars held on sidings waiting to be loaded from time to time and not immediately and completely.

Another similar example involves the operation of a treatment plant which must be supplied continuously with the bulk material for treatment in large quantities at an even or fixed rate. Thus, a storage area for bulk material must be provided having extremely large quantities of the bulk material from which the material is reclaimed to continuously supply the treatment plant.

In other instances, bulk material, constituting the input for a storage area, may arrive in much larger quantities or more rapidly than such material is withdrawn from storage.

Further, the bulk material may arrive at storage areas in large dump-truckloads, while reclaiming the material from other storage areas is proceeding and should proceed continuously at a fixed rate from stored material and additional materials dumped, during reverse movement of the reclaimer device.

Accordingly, from the standpoint of economical operation, a reclaimer device can be used under all of the varying conditions described for handling bulk material so that the reclaimer, when operating, may be operated continuously in any direction of its movement whether forward or rearward from any particular location either straight-away or in an arcuate path at bulk material storage areas.

Figure 1:
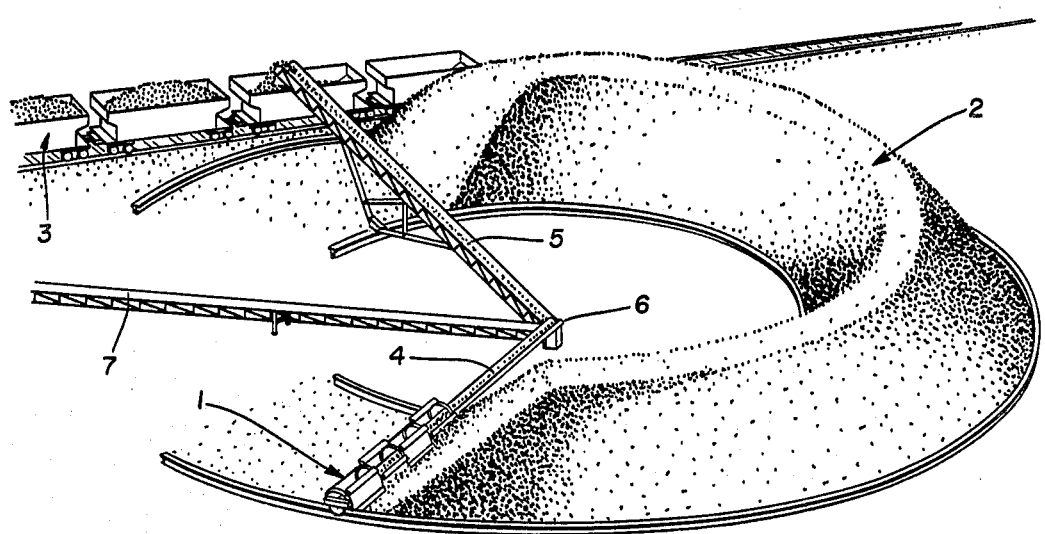
FIG. 1 is a diagrammatic perspective view of a storage lot for bulk material illustrating the reclaimer of the invention installed as a component of otherwise typical bulk handling transport equipment.
Figure 2:
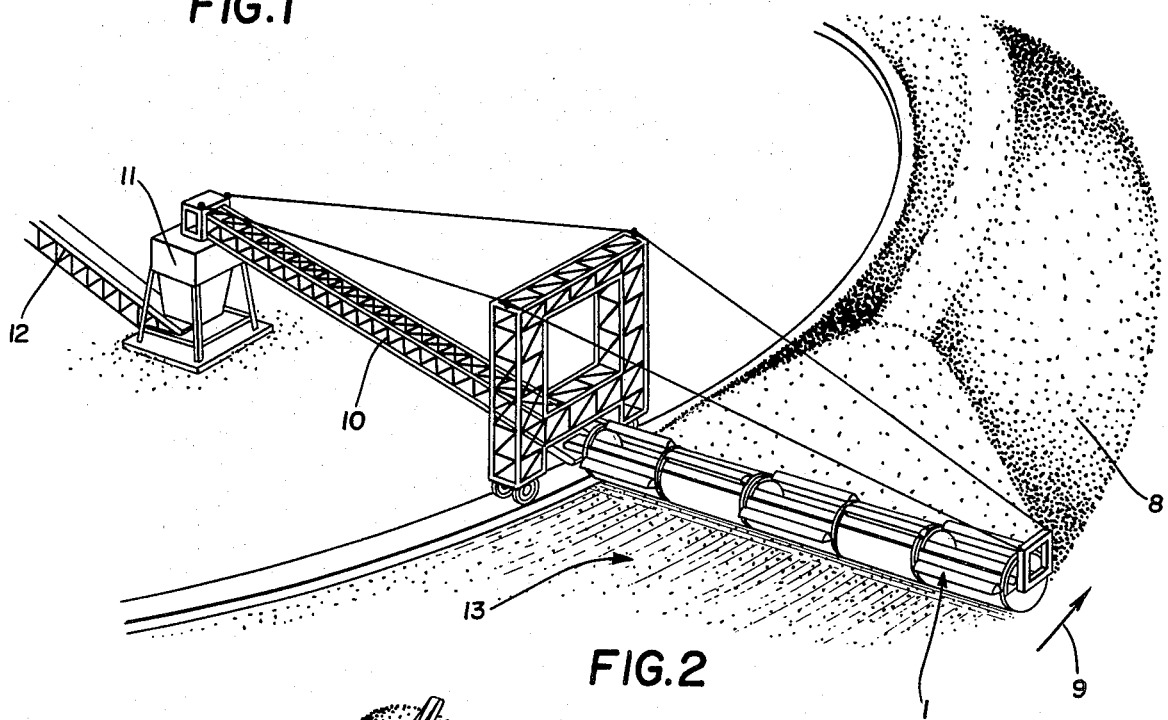
FIG. 2 is a diagrammatic perspective view of another form of bulk material handling and transport equipment in which the improved reclaimer of the invention is installed as a part of the equipment.
Figure 3:
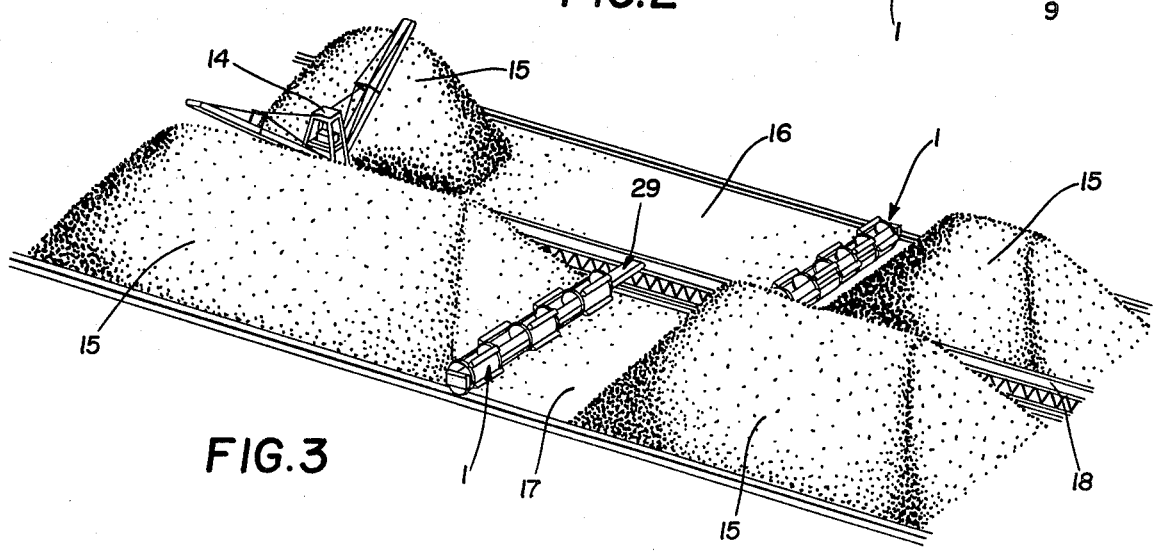
FIG. 3 is a diagrammatic perspective view of another form of bulk material storage area in connection with which the improved reclaimer of the invention is illustrated to reclaim bulk material stored in rectangular storage areas.

FIGS. 1, 2 and 3 diagrammatically illustrate several bulk material handling and storage installations wherein the improved reclaimer generally indicated at 1 forms a part or component of the handling equipment.

FIG. 1 illustrates a large storage yard for coal that has been delivered from and continues to be delivered from a wash plant. Thousands of tons of coal are accumulated at 2 prior to loading the same into say a 100-car train indicated at 3. The reclaimer 1 discharges the coal to a conveyor 4 which delivers the coal to a stacker conveyor or loader 5 that discharges coal to the railroad cars 3. The coal delivered from the stack 2 by reclaimer 1 is joined at junction 6 by coal delivered from the wash plant by conveyor 7. After the cars 3 have been loaded, coal from the wash plant may be stored in the depleted storage area in any suitable manner either by the stacker 5 or by a second stacker or other additional means not shown so that a quantity of coal is available for reverse movement of the reclaimer 1.

In FIG. 2, another sweep type operation is carried out by reclaimer 1 which moves against the stack of bulk material 8 in moving in the direction of the arrow 9 against the end of the stacked material. The reclaimer 1 delivers the material through a conveyor 10 to a hopper 11 which feeds a conveyor 12 which discharges onto any convenient mode of transportation for the material to a place of use. Meanwhile, bulk material 8 is delivered by trucks to the empty storage area 13 behind the reclaimer 1 so that when movement of the reclaimer 1 in a direction opposite to the direction of the arrow 9, bulk material is reclaimed during reverse movement of the reclaimer 1.

FIG. 3 illustrates rectangular storage areas side by side. Bulk material is delivered by a conveyor, not shown, to the stacker 14 which discharges the material into piles 15 in rectangular storage areas 16 and 17. An improved reclaimer 1 for each area 16 or 17 moves back and forth in its respective area, rectilinearly, to reclaim the stored material in stacks 15 and discharge the same to a delivery conveyor 18 which conveys the reclaimed material to other transport means such as a ship, a railroad car, a truck or the like.

First Embodiment

Figure 4:
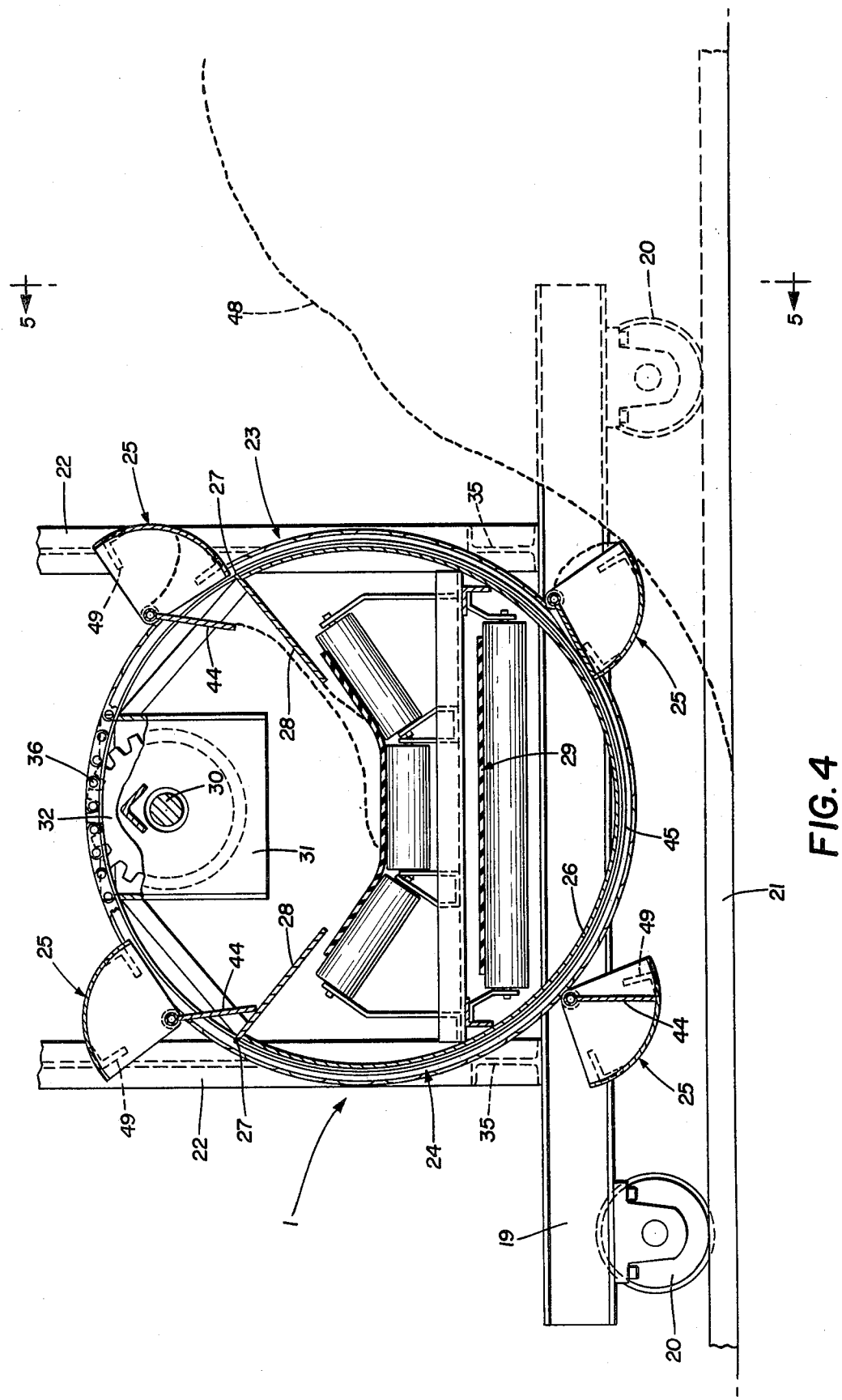
FIG. 4 is a sectional view looking axially into a reclaimer unit mounted on a movable truck platform adapted to reclaim bulk material from the type of installation illustrated in FIG. 3.
Figure 5:
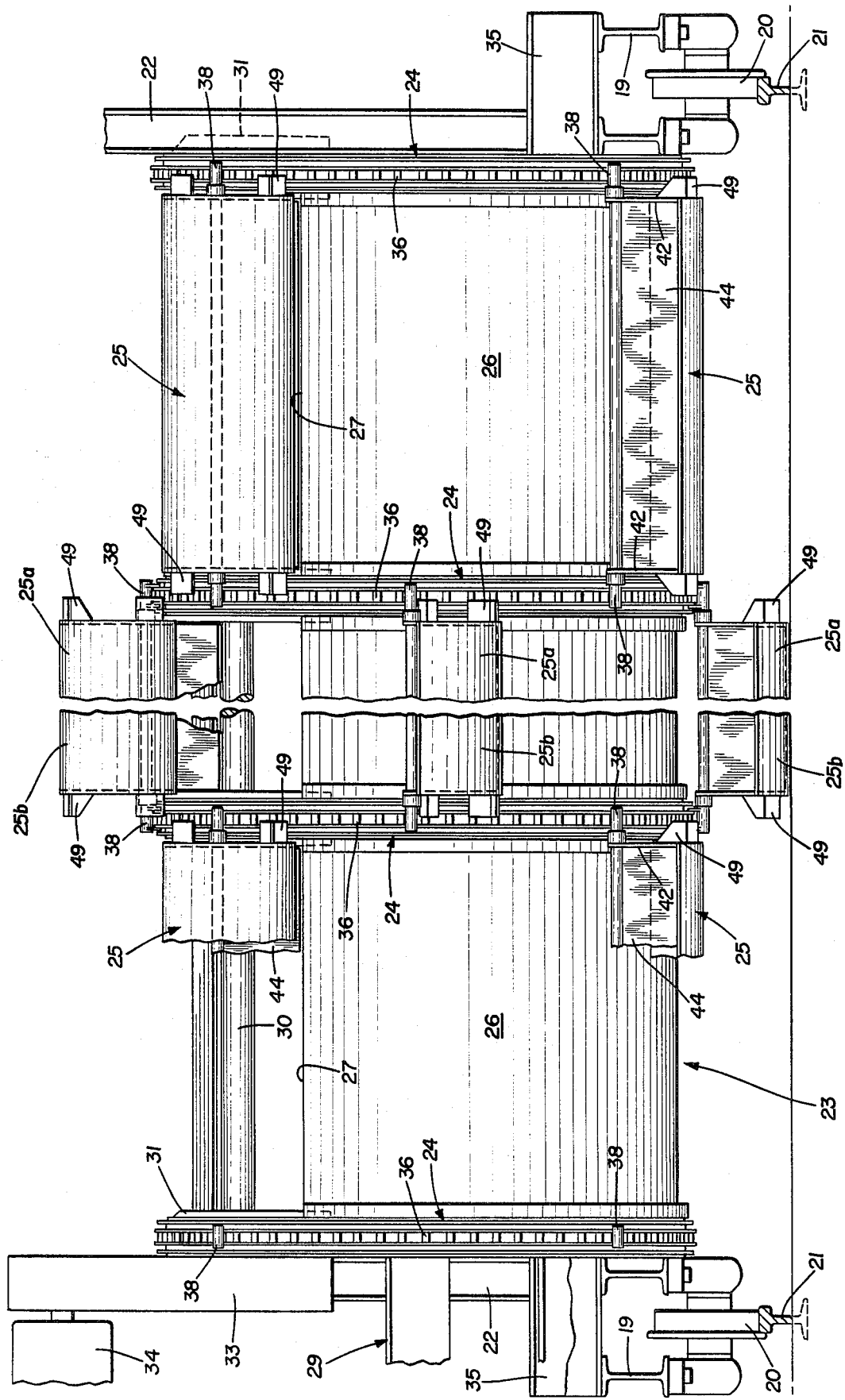
FIG. 5 is a side elevation with parts broken away in the central portion of the view looking in the direction of the arrows 5—5, FIG. 4.

A form of the improved reclaimer 1 is shown in more detail in FIGS. 4 and 5. The reclaimer 1 is mounted on a carriage, support, or frame including beam frame members 19 movable on wheels 20 which may travel along rails 21. Wheel-supported frame members 19 are provided at each end of the reclaimer having upright frame members 22 connected by suitable means to the ends of a reclaimer cage generally indicated at 23.

The cage 23 is formed by a series of spaced peripheral channel shaped ribs generally indicated at 24 which form tracks to be described later in connection with FIGS. 7 and 8.

Figure 6:
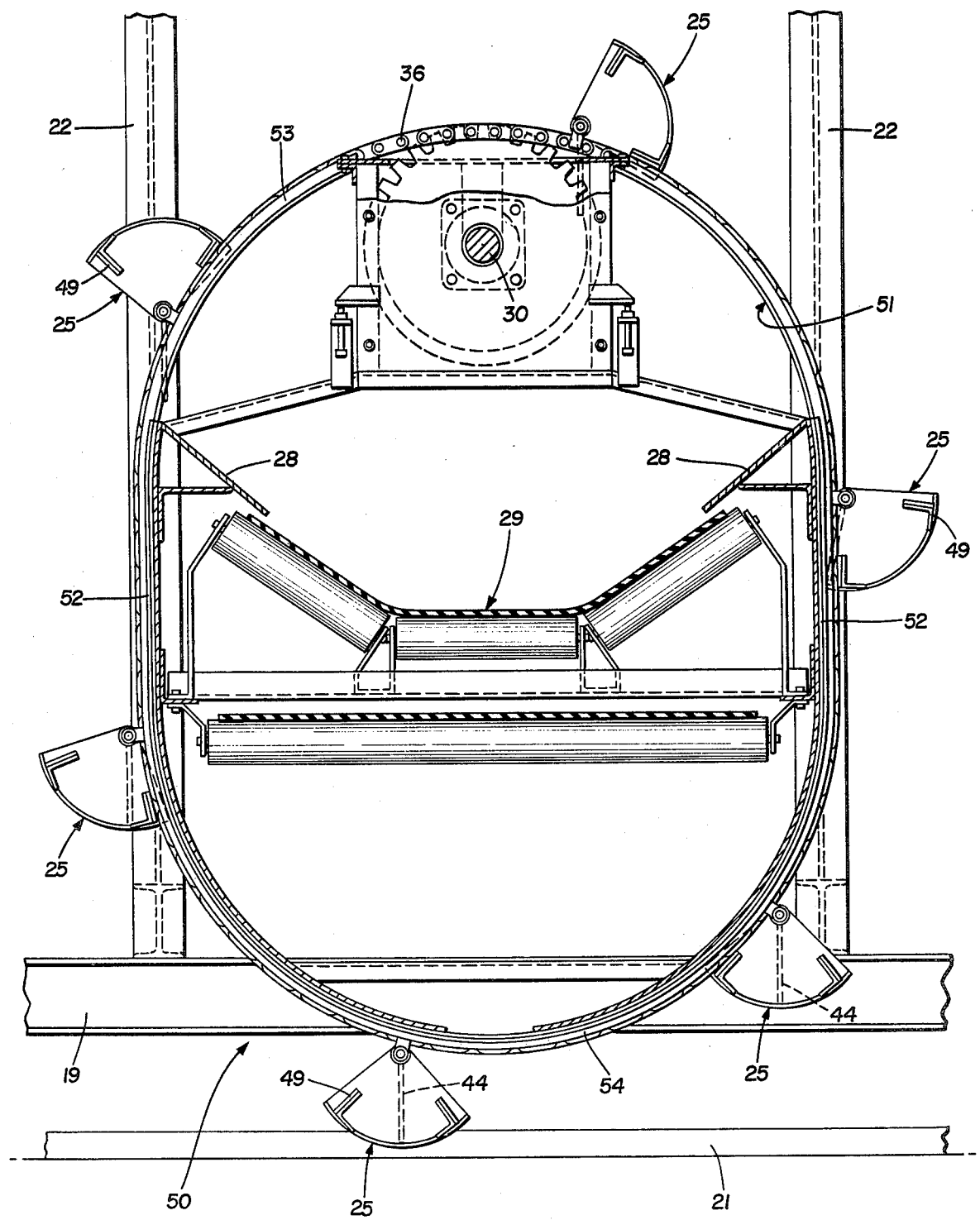
FIG. 6 is a sectional view similar to portions of FIG. 4 showing a modified orbit of travel for the reclaimer buckets around the reclaimer support cage.
Figure 7:
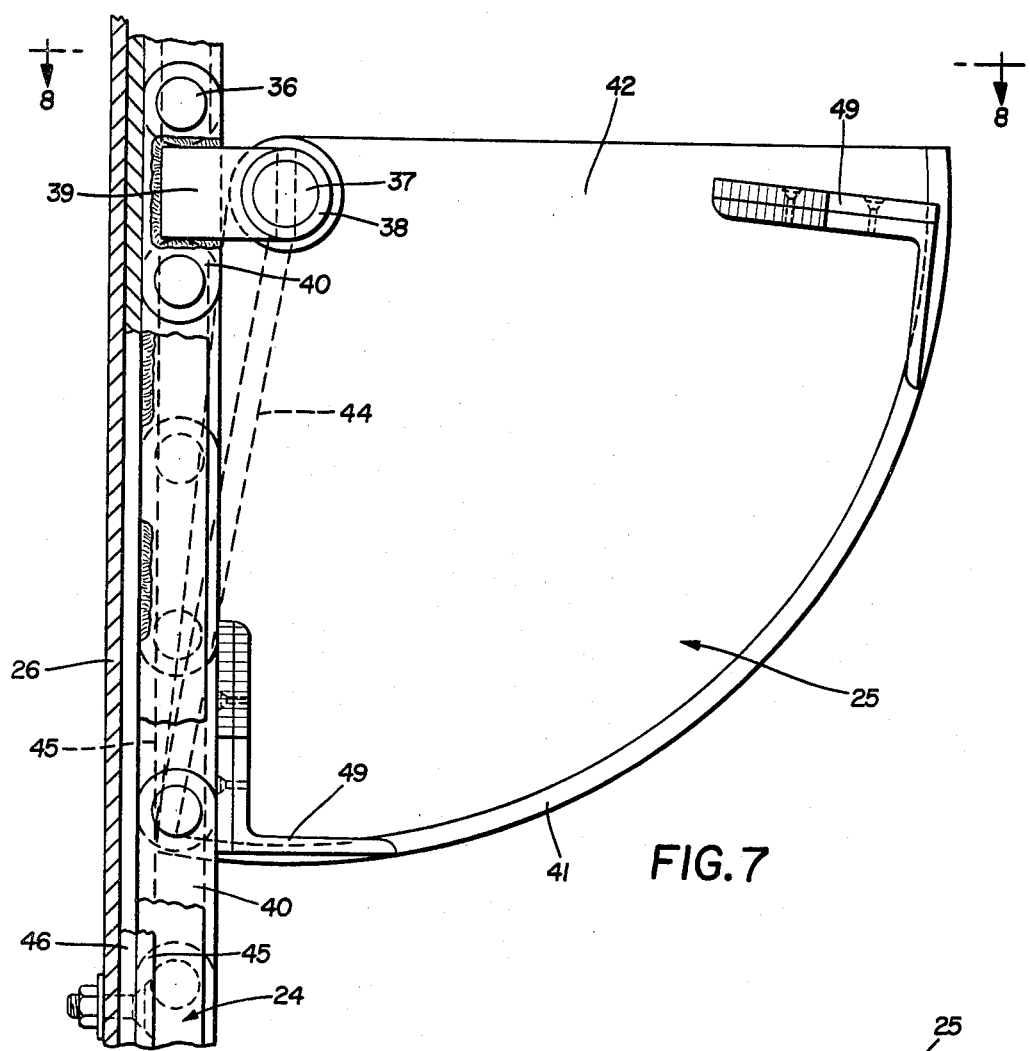
FIG. 7 is a substantially enlarged fragmentary sectional view, with parts broken away, looking toward the end of a bucket illustrated at the right side of FIG. 6.
Figure 8:
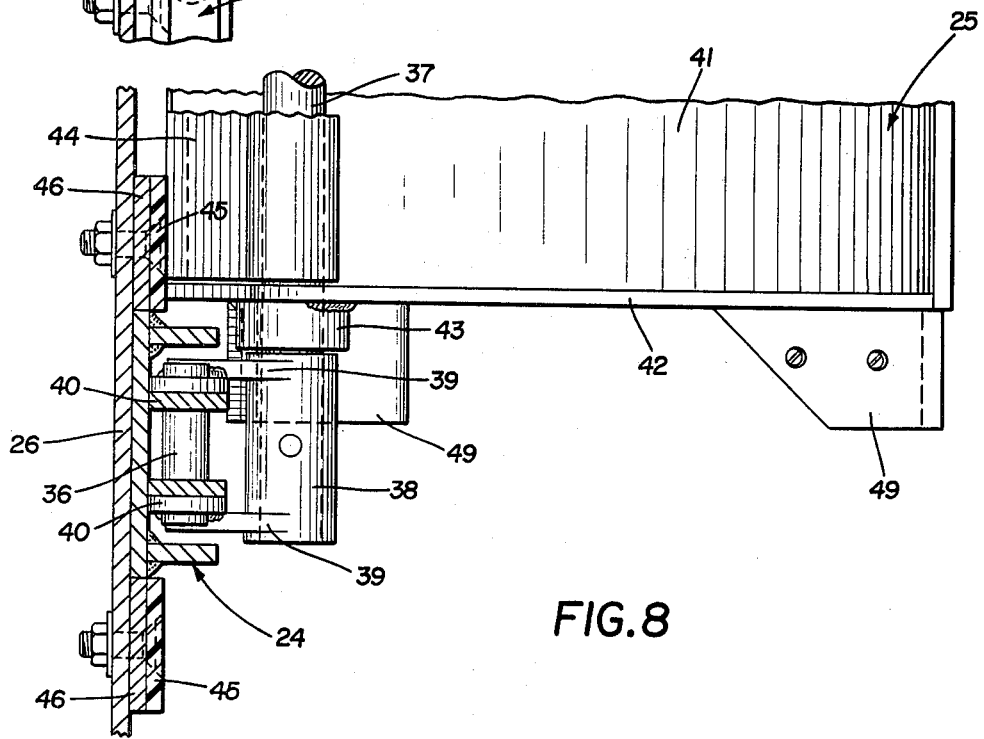
FIG. 8 is a fragmentary sectional view of the parts shown in FIG. 7 looking in the direction of the arrows 8—8, FIG. 7.

FIGS. 7 and 8 primarily illustrate details of the construction of the buckets shown in FIGS. 4, 5, 6 and 9, as well as the pivotal mounting of the buckets on the chains which move the buckets peripherally around the reclaimer cages. Although FIGS. 7 and 8 show straight sections of channel ribs 24 similar to a portion of the embodiment illustrated in FIG. 6, the construction is the same throughout curved portions of the circular channel rib 24 shown in FIG. 4, as in the straight and lower semicircular portion of the channel rib shown in FIG. 6.

In the form of the invention shown in FIGS. 4 and 5 the channel shaped ribs are circular in extent forming an endless outwardly opening track to be further described in detail below.

Four ribs 24 are illustrated in FIG. 5 and one series of buckets, generally indicated at 25 is mounted in a manner described below extending between the right-hand pair of ribs, and another series of buckets is mounted on the left-hand pair of ribs 24 illustrated in FIG. 5. Four buckets 25 are illustrated in FIG. 4 in each series of buckets.

For ease in illustration, only two complete sets or series of buckets are shown in FIG. 5 which are located at the right- and left-hand ends of the cage 23. The cage 23 may have any desired or required axial length and accordingly any desired number of sets or series of buckets may be contained in any reclaimer, five sets of buckets being shown, for example, in FIG. 2.

In FIG. 5, the central portion of the cage is shown broken away to illustrate the ends only of the sets of buckets connected to those illustrated at the ends of the cage. The circumferential or peripheral location of the buckets 25 is staggered between adjacent sets of buckets. This is apparent in viewing the reclaimer 1 illustrated in FIGS. 1, 2 and 3. More particularly it is shown by the location of the buckets 25a and 25b in FIG. 5 which are adjacent to and staggered with respect to the buckets 25 in the two series of buckets illustrated at the ends of the reclaimer cage 23.

A curved metal wall 26 is connected to and extends between each pair of ribs 24 throughout the length of the cage 23 to form a troughlike bottom wall for the cage 23 throughout its length. The curved cage wall 26 terminates in upper open edges 27 and baffle walls 28 extend downward inward toward the center of the cage throughout the length of the cage.

A typical endless belt conveyor indicated generally at 29 is mounted within the cage 23 and extends from the outer or right-hand end of the cage (viewing FIGS. 2 and 5) toward the left-hand or inner end of the cage where it is connected with or communicates with a belt delivery or discharge conveyor such as the conveyors 4 and 10, respectively, of FIGS. 1 and 2.

A bucket drive shaft 30 is journaled in bushing blocks or housings 31 and extends the complete length of the reclaimer 1. There is a bushing block 31 located below and mounted on the top portion of each channel rib 24 and within the bushing block or housing a sprocket 32 is mounted on the shaft 30. The left-hand end of the shaft 30 is connected with drive means indicated at 33 connected with a drive motor diagrammatically indicated at 34 for rotating the shaft 30 in one direction or another.

The reclaimer 1 may have a drive motor for driving the carriage wheels 20 to bodily move the reclaimer 1 in either direction along the rails 21.

As indicated in FIG. 5, the beam frame members 19 may have cross-beam sections 35 mounted thereon on which the upright frame members 22 are mounted. The upright frame members 22 and cross-beam sections 35 each are connected by welding to the channel ribs 24 at the ends of the cage 23 to support the cage on the frame members 19 supported by the wheels 20 as stated.

An endless chain 36 is mounted in each channel rib 24 (FIGS. 7 and 8). A bucket pivot shaft 37 is fixed at each end to a sleeve 38 (FIG. 8). Each sleeve 38 has a pair of lugs 39 projecting therefrom which are welded to and extend outward from links 40 of the chain 36 at the desired location for one of the buckets in the series or set of buckets mounted on a spaced pair of adjacent channel ribs. The bucket pivot shafts 37 do not rotate but are carried in an orbit of travel by the chains as the chains are moved around the channel ribs in either direction by sprockets 32 which in turn are driven by the bucket drive motor 34.

Each bucket 25 preferably has a cylindrically shaped bucket scoop wall 41 the ends of which are closed by arcuate bucket end walls 42. At the apex of the arcuate bucket end walls 42 bushing sleeves 43 are welded exteriorly to the bucket end walls 42 to pivotally journal the bucket on the pivot shaft 37. A scooped-material-retainer plate 44 also is pivotally mounted on the shaft 37 and extends between the bucket end walls 42.

A friction-reducing rub strip 45 held on a retainer 46 is mounted on curved cage wall portions 26 laterally adjacent each edge of each channel rib 24 as shown in FIG. 8. The rub strips 45 are formed of polyethylene, Nylon, or some similar friction-reducing material and terminate at the free edges 27 of the curved cage walls 26.

As long as the buckets travel in their orbit of travel by chain movement opposite the cage wall 26, the corners of the swinging free edge of the retainer plate slide along the rub strips 45 to hold the retainer plates 44 in a position closing buckets 25. Thus, the swinging retainer plate 44 of any bucket holds bulk material scooped by bucket in the bucket during upward movement of the bucket in either direction of bucket travel with movement of the endless chains 36.

Referring to FIG. 4, assuming that the chains and buckets are being driven in a counterclockwise direction around the retainer cage, one of the buckets, such as the lower right-hand bucket in FIG. 4, scoops bulk material from a mound thereof indicated in doted lines at 48, the bulk material being held in the bucket by the retainer plate 44. As the bucket moves upward and reaches the position shown by the upper right-hand bucket in FIG. 4, the retainer plate 44 is released from the rub strips 45 and swings open, as shown, as a result of which the bulk material in the bucket 25 is dumped along the baffle plate 28 and is deposited on the belt conveyor and carried thereby to the discharge end of the belt conveyor 29.

An angle bracket 49 projects outwardly from the bucket end plates 42 adjacent each corner of each end plate adjacent the free edges of the curved bucket scoop wall 41 (FIGS. 5, 7 and 8). One pair of the brackets 49 engage the chains 36 at each end of each bucket to hold the buckets outside of the chains and cage as the buckets move across the top portion of the cage channel ribs 24. Under these conditions there is no relative movement between the buckets and chains and, thus, no rubbing friction therebetween.

In the operation of any of the reclaimers 1 described in any of the figures of the drawings, any bucket in any series of buckets pivotally mounted at spaced intervals on a pair of chains which surround the cage is movable in an endless orbit or path of travel in either direction around the periphery of the cage.

This bucket movement is present with any bucket in any of the multiple series of buckets supported on the cage wherein the buckets in one series are staggered in peripheral locations with respect to buckets in an adjacent series.

The bucket mounting chains are guided in paths which extend endlessly around the periphery of the cage. In its orbit of movement any bucket travels from the bottom or lower portion of the cage upward along one side portion of the cage to the top of the cage and then down the other side of the cage to the bottom of the cage.

FIGS. 7 and 8 primarily illustrate details of construction of the buckets shown in FIGS. 4, 5, 6 and 9, as well as the pivotal mounting of the buckets on the chains which move the buckets peripherally around the reclaimer cages. Although FIGS. 7 and 8 show straight sections of channel ribs 24 similar to a portion of the embodiment illustrated in FIG. 6, the construction is the same throughout curved portions of the circular channel rib 24 shown in FIG. 4, as in the straight and lower semicircular portion of the channel rib shown in FIG. 6.

Thus, in the operation of a reclaimer, as the buckets move around the lower portions of their orbits of travel on the cage and as the cage is moved bodily toward stacked bulk material, the buckets dig, chew or bite into the stacked bulk material and scoop portions thereof into the buckets. When the buckets reach the upper portions of their orbits of travel the bucket contents are dumped to the interior of the cage and flow onto the belt conveyor in the cage.

Such operation proceeds as described regardless of the direction of orbital travel of the chains and buckets. Travel of the chains in either direction is obtained merely by the use of reversible motor means diagrammatically indicated at 34.

During such an operation, as the reclaimer 1 approaches one end or the other of an accumulation or stack of bulk material in a storage area, the direction of movement of the reclaimer is reversed and at the same time the direction of movement of the endless chains 36 is reversed and the buckets then proceed to scoop up bulk material which meanwhile has been delivered to the storage area during the time when the reclaimer traveled in the original or first direction described.

This reverse movement function of the reclaimer back and forth along and through bulk material accompanied by reverse bucket movement on the reclaimer cage permits continuous discharge of bulk material to the belt conveyor 29. Such procedure in the operation of the reclaimer equipment eliminates delays involved in the use of prior art devices or eliminates the requirement of a surge tank hopper into which the belt conveyor 29 discharges bulk material. Such a surge tank hopper heretofore has been required to bridge the intermittent operation of a reclaimer having buckets which traveled in one direction only.

The concepts of construction and operation of the reclaimer with productive multidirectional movement of the reclaimer cage and with multidirectional movement of buckets on the cage, simplify bulk material handling and reclaiming operations with equipment which may be easily installed in existing systems to provide a simple energy-efficient installation.

Second Embodiment

The construction and operation of the reclaimer generally indicated at 50 in FIG. 6 is identical with the construction and operation of the reclaimer 1 described in connection with FIGS. 4, 5, 7 and 8 excepting that the cage 51 and its components have an upright oval shape in cross section with vertical upright track portions 52 joined with the upper and lower semicircular track portions 53 and 54, the semicircular track portions 53 and 54 being the same as the corresponding semicircular portions of the device shown in FIG. 4.

Thus, the cage of reclaimer 50 is somewhat larger and taller and provides for readily mounting a greater number of buckets, if desired, than the number of buckets shown in FIG. 4. The differences in size and number of buckets results from design requirements for reclaimers handling different kinds of bulk material.

As previously indicated, FIGS. 7 and 8 show details of the chains, buckets and bucket retainers present in the reclaimer 50.

Third Embodiment

The reclaimer 55 illustrated in FIG. 9 is quite similar to the reclaimers 1 and 50 shown in FIGS. 4 and 6 excepting for the cross-sectional shape of the cage structure in FIG. 9 which has a teardrop form. The lower portion 56 of the teardrop-shaped cage of reclaimer 55 in FIG. 9 as well as the chains 36 and buckets 25 and bucket retainer plates 44 are similar to corresponding components of the reclaimer 1 of FIG. 4 and the reclaimer 50 of FIG. 6.

However, in FIG. 9, the channel ribs 24 terminate on each side at the baffles 28 and are replaced by straight inwardly opening channel-shaped cage frame members 57 which meet at and are connected with apex frame plates 58. The chains 36 in their movement are easily supported by the channel members 57. Channel rib sections 24-1 are mounted on the apex plates 58 and resume the track support for the chains 36 as the chains travel around the bushing blocks 31-1 which journal sprockets 32-1 that are mounted on bucket drive shaft 30-1 driven by a reversible drive motor such as diagrammatically indicated at 34 in FIG. 5.

The operation, as stated, of the reclaimer 55 of FIG. 9 otherwise is the same as that of the reclaimers shown in FIGS. 1, 4 and 6.

Fourth Embodiment

The reclaimer 59 shown in FIGS. 10 and 12 is similar, having an oval-shaped cage, to the reclaimer 50 shown in FIG. 6. The construction and operation of reclaimer 59 differs from that of the reclaimer of FIG. 6 in that the buckets 60 have a slightly different construction, the retainer plates 44 for the buckets in FIG. 6 are omitted and preferably a trigger mechanism is provided for tilting the buckets 60 as they ascend from the lower to the upper portion of the reclaimer cage 61.

Each bucket 60 is generally scoop-shaped but has a central fixed internal dividing wall 62 which cuts the bucket capacity in half as compared with buckets of FIG. 6. The buckets 60 are journaled on a bucket pivot shaft 63 (FIG. 12), the shaft 63 being fixed at its ends to sleeves 64 mounted on chain links of the chain 65 in a manner similar to that described in connection with FIG. 8. The end walls 66 of the buckets 60 are angled inward toward the apices thereof where they are journaled on the shaft 63 so that the edges 67 of the curved or scoop wall of the buckets extend laterally beyond the ends of the shaft 63 so as to rest on the chain 65 during movement in the orbit of travel of the chains 65. Thus, there is no relative movement between the buckets and chains when engaged. However, polyethylene rub strips 68 preferably are provided within the cage rib channels 69.

L-shaped bucket-dump-triggers 70 are pivotally mounted on the rib channels 69 above the baffles 28. As a bucket moves upward on the right side of the device shown in FIG. 10, the short leg 71 of the trigger 70 is engaged by the bucket, and continued bucket movement pivots the trigger to the dot-dash position of FIG. 10 so that the long leg 72 of the trigger 70 tips the bucket to the dot-dash position shown, thereby emptying the bulk material in the upper half of the ascending bucket.

The trigger 70 on the left-hand portion of FIG. 10 functions in the same manner when the buckets are moving in a clockwise direction around the reclaimer cage.

Fifth Embodiment

A fifth embodiment of the invention is illustrated in FIG. 11 which differs from the construction of FIG. 10 only in that the buckets 73 have a lateral triangular shape rather than the circular shape for the scoop wall of the bucket.

IN GENERAL

Each of the foregoing alternative reclaimer constructions or devices operate in the same manner in performing a reclaiming procedure in that any bucket in any series of buckets pivotally mounted on a pair of chains which surround a cage is movable in an endless orbit or path of travel in either direction around the periphery of the cage.

Such bucket movement is present with any bucket in any of the multiple series of buckets supported on the cage, the buckets in any one series being staggered in peripheral locations with respect to buckets in an adjacent series.

The multidirectional movement of the reclaimer cage and the multidirectional movement of the buckets arranged in a plurality of series of buckets along the length of the cage, with the buckets moving in an endless path of travel in either direction around the cage, provides for rapid, efficient and 100% productive operation of the reclaimer. At the same time, movement of the buckets on a reclaimer so constructed and operated coordinates and correlates the attack of the buckets in moving into and scooping into stacked bulk material that degradation of the bulk material is minimized.

Accordingly, the new reclaimer construction and operation satisfy the stated objectives and solve problems and satisfy needs that have long existed in the art.

In the foregoing description, certain terms have been used for brevity, clearness and understanding; but no unnecessary limitations are to be implied beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the new reclaimers are constructed and function; and the advantageous, new and useful results obtained; the new and useful structures, devices, components, elements, arrangements, parts, combinations, operations, procedures and relationships are set forth in the appended claims.

I claim:

1. Reclaimer construction for reclaiming bulk material from mounds thereof in storage areas of the type in which the mounds extend in rectilinearly or arcuately formed mounds of stacked bulk material; including frame means having spaced upright end support members; a cage extending longitudinally between and supported on said end support members; means for moving the frame means and cage in either direction laterally of the cage toward a mound of stacked bulk material; the cage including channel track means having members extending at spaced intervals endlessly around the cage and defining the periphery of the cage; said spaced track members being formed by channel ribs opening outwardly and extending semicircularly around at least the lower portion of the cage; curved wall members connected between adjacent pairs of channel ribs terminating in edges at each side of the cage extending longitudinally of the cage; baffle walls extending downwardly inwardly longitudinally of the cage from said upper curved wall edges; an endless belt conveyor extending longitudinally below the baffle walls from one cage end to a conveyor discharge end at the other end of the cage; a chain extending along each track member for movement in an endless orbit of travel along said track means; means for moving said chains in either direction in said orbit of travel; a series of buckets pivotally mounted on said chains at spaced intervals extending between each adjacent pair of chains; the buckets in one series being mounted in staggered locations with respect to the buckets in the next adjacent series of buckets; and means for releasing material scooped by the buckets from each bucket as it moves upward along one side of the cage past an upper cage curved wall edge.

2. The construction defined in claim 1 in which each bucket includes a concave scoop wall extending longitudinally of the cage, segment-like end walls connected to the ends of the scoop wall, the segment-like end walls each having an apex portion, the apex portion being pivotally mounted on a pivot shaft the ends of which are connected to lugs mounted on and projecting from chain links of adjacent pairs of chains between which the bucket extends.

3. The construction defined in claim 2 in which the concave bucket scoop wall is curved arcuately in cross section.

4. The construction defined in claim 2 in which the concave scoop wall is V-shaped in cross section.

5. The construction defined in claim 2 in which the concave scoop wall terminates in longitudinally extending edges; in which the bucket end walls have angled portions at the ends of said bucket edges; and in which said bucket angled end wall portions at the ends of one of the bucket edges engage the adjacent chains on which the bucket is pivotally mounted during at least a portion of bucket movement in its orbit of travel.

6. The construction defined in claim 1 in which a bushing block is mounted on a top portion of each channel track means within the cage; in which a chain drive shaft is journaled in said bushing blocks extending longitudinally of the cage from end to end; in which a sprocket is mounted on said drive shaft within each bushing block in driving engagement with the chain extending along the channel track means member on which such bushing block for the sprocket engaged with said chain is mounted; and in which reversible drive motor means is operatively connected with said shaft, thereby providing the means for moving said chains in either direction in their orbits of travel.

7. The construction defined in claim 2 in which the means for releasing material scooped by the buckets from each bucket as it moves upward along one side of the cage includes a scoop-material-retainer plate, said retainer plate being pivotally mounted on the bucket pivot shaft having a swinging edge adapted to swing along and out of the concave bucket scoop wall during bucket movement in its orbit of travel; friction-reducing rub strips mounted on the curved cage wall members adjacent the channel ribs, said rub strips extending between the curved wall member edges; the swinging edge of the retainer plate of any bucket riding on said rub strips as a bucket moves upward in its orbit of travel along one side of the cage to retain bulk material scooped by the bucket during such upward movement; and said retainer plate being released from the rub strips to release bulk material in the bucket into the cage and onto a cage baffle wall as such bucket moves upward beyond a curved cage wall member edge.

8. The construction defined in claim 2 in which the concave scoop wall terminates in longitudinally extending edges; in which the means for releasing material scooped by the buckets from each bucket as it moves upward along one side of the cage comprises a central partition wall fixed to the bucket scoop and end walls intermediate the bucket scoop wall edges; in which trigger means is mounted on the channel ribs above each end of each curved cage wall member terminal edge; and in which said trigger means engages each bucket during bucket movement in its orbit of travel as such bucket moves upward beyond said curved cage wall member edge and pivots said bucket over center on its pivot shaft to release bulk material in the bucket into the cage and onto a cage baffle wall.

9. The construction defined in claim 8 in which the trigger means comprises an L-shaped member having first and second legs pivotally mounted on a channel rib; in which the first leg normally projects into the path of bucket travel and is engaged by an upwardly moving bucket; and in which the second trigger leg then pushes the bucket pivotally over center as the bucket continues upward movement toward the top of the cage to release bulk material in the bucket into the cage onto a cage baffle wall.

10. The construction defined in claim 1 in which the frame means includes main beam members at each end of the cage extending laterally of the cage between first and second ends from which the spaced upright beam end support members extend upward adjacent the sides of each end of the cage; in which crossbeam members extend longitudinally of the cage along each side of the cage supported at their ends on said main beam members; in which wheel means are mounted on said frame means at each end of each main beam member, whereby the frame means and cage may be moved in either direction toward a selected stored mound of stacked bulk material; and in which motive means are mounted on the frame means for moving the frame means on said wheel means in either direction.

* * * * *